(12) United States Patent
Böttcher et al.

(10) Patent No.: US 8,237,978 B2
(45) Date of Patent: Aug. 7, 2012

(54) METHOD COMPUTER PROGRAM AND DEVICE FOR GENERATION OF INDIVIDUALIZED PRINT MEDIA COPIES

(75) Inventors: Frank Böttcher, Hoppegarten (DE);
Egbert Schürer, Halle (Saale) (DE);
Henrik Teuscher, Halle (DE); Thomas Lasch, Bad Lauchstädt (DE); Jörg Kaltenborn, Halle (DE)

(73) Assignee: Océ Printing Systems GmbH, Poing (DE)

( * ) Notice: Subject to any disclaimer, the term of this patent is extended or adjusted under 35 U.S.C. 154(b) by 1121 days.

(21) Appl. No.: 12/090,402

(22) PCT Filed: Oct. 16, 2006

(86) PCT No.: PCT/EP2006/067450
§ 371 (c)(1),
(2), (4) Date: Apr. 16, 2008

(87) PCT Pub. No.: WO2007/045632
PCT Pub. Date: Apr. 26, 2007

(65) Prior Publication Data
US 2008/0301678 A1 Dec. 4, 2008

(30) Foreign Application Priority Data
Oct. 17, 2005 (DE) .......................... 10 2005 049 596

(51) Int. Cl.
*G06K 15/00* (2006.01)
*G06F 3/12* (2006.01)
(52) U.S. Cl. ...................................... 358/1.18; 358/1.15
(58) Field of Classification Search .................. None
See application file for complete search history.

(56) References Cited

U.S. PATENT DOCUMENTS

| 7,330,828 B2 | 2/2008 | Schoder et al. |
| 7,333,246 B1 | 2/2008 | Kowalski et al. |
| 2004/0036902 A1 | 2/2004 | Ducato |
| 2005/0021404 A1 | 1/2005 | Schoder et al. |
| 2005/0034070 A1 | 2/2005 | Meir et al. |
| 2005/0119901 A1 | 6/2005 | Ullrich |

FOREIGN PATENT DOCUMENTS

| DE | 101 61 684 | 7/2003 |
| EP | 1 176 520 | 1/2002 |
| WO | WO 00/68877 | 11/2000 |
| WO | WO 01/77807 | 10/2001 |

(Continued)

OTHER PUBLICATIONS

Professor Schroder Jeder sein eigener Chefredakteur Technology Review Nils Schiffhauer et al Dec. 2004—See Attached Translation.

(Continued)

*Primary Examiner* — Dov Popovici
(74) *Attorney, Agent, or Firm* — Schiff Hardin LLP

(57) ABSTRACT

In a method or system for generation of media print copies of at least one media title, running data are generated in an editing computer, the running data being associated with a media page. The running data have reference information and are transferred to a job system. Job data of an individual job are generated from the running data and from customer-specific data that correspond to media categories of the media title. Individual page frame data are formed from the job data. Control information is attained from the job data and with the control information the page frame data are merged with page content data of pages filled with editorial information.

10 Claims, 8 Drawing Sheets

FOREIGN PATENT DOCUMENTS

| | | |
|---|---|---|
| WO | WO 03/052648 | 6/2003 |
| WO | WO 03/054783 | 7/2003 |
| WO | WO 03/065197 | 8/2003 |

OTHER PUBLICATIONS

Digital Printing Technologies for Variable Data Printing—Océ Printing Systems GmbH—Feb. 2005, $9^{th}$ Edition ISBN 3-00-001019-X Kapitel 4.3 and 5.

| File name | Page number | Title | Date | Edition | Real name |
|---|---|---|---|---|---|
| 0710.1-ALN_HP01___7000_70_70.pdf | 1 | Aschersiebener Zeitung | 07.10.2005 | 1 | Aschersleben |
| 0710.DT-02_HP02___7000_70_70.pdf | 2 | Der Tag | 07.10.2005 | 1 | Aschersleben |
| 0710.MI-03_HP03___7000_70_70.pdf | 3 | Mitteldeutschland | 07.10.2005 | 1 | Aschersleben |
| 0710.MH-04_HP04___7000_70_70.pdf | 4 | Meinung und Hintergrund | 07.10.2005 | 1 | Aschersleben |
| 0710.PO-05_HP05___7000_70_70.pdf | 5 | Politik | 07.10.2005 | 1 | Aschersleben |
| 0710.WI-06_HP06___7000_70_70.pdf | 6 | Wirtschaft | 07.10.2005 | 1 | Aschersleben |
| 0710.WI-07_HP07___7000_70_70.pdf | 7 | Wirtschaft | 07.10.2005 | 1 | Aschersleben |
| 0710.KU-08_HP08___7000_70_70.pdf | 8 | Kultur | 07.10.2005 | 1 | Aschersleben |
| 0710.ALN09_HP09___7000_70_70.pdf | 9 | Aschersiebener Zeitung | 07.10.2005 | 1 | Aschersleben |
| 0710.ALN10_HP10___7000_70_70.pdf | 10 | Aus der Region | 07.10.2005 | 1 | Aschersleben |
| 0710.ALN11_HP11___7000_70_70.pdf | 11 | Lokales | 07.10.2005 | 1 | Aschersleben |
| 0710.ALN12_HP12___7000_70_70.pdf | 12 | Service | 07.10.2005 | 1 | Aschersleben |
| 0710.ALN13_HP13___7000_70_70.pdf | 13 | Kultur aus der Region | 07.10.2005 | 1 | Aschersleben |
| 0710.ALN14_HP14___7000_70_70.pdf | 14 | Lokalsport | 07.10.2005 | 1 | Aschersleben |
| 0710.ALN15_HP15___7000_70_70.pdf | 15 | Lokalsport | 07.10.2005 | 1 | Aschersleben |
| 0710.SP-A16_HP16___7000_70_70.pdf | 16 | Sport | 07.10.2005 | 1 | Aschersleben |
| 0710.SP-A17_HP17___7000_70_70.pdf | 17 | Sport | 07.10.2005 | 1 | Aschersleben |
| 0710.LWLMZ_HP18___7000_70_70.pdf | 18 | LWLMZ | 07.10.2005 | 1 | Aschersleben |
| 0710.TV-A19_HP19___7000_70_70.pdf | 19 | Medien | 07.10.2005 | 1 | Aschersleben |
| 0710.PA-A20_HP20___7000_70_70.pdf | 20 | Panorama | 07.10.2005 | 1 | Aschersleben |
| 0710.RE-A21_HP21___7000_70_70.pdf | 21 | Reise | 07.10.2005 | 1 | Aschersleben |
| 0710.RE-A22_HP22___7000_70_70.pdf | 22 | Reise | 07.10.2005 | 1 | Aschersleben |
| 0710.RE-A23_HP23___7000_70_70.pdf | 23 | Reise | 07.10.2005 | 1 | Aschersleben |
| 0710.RA-A24_HP24___7000_70_70.pdf | 24 | Essen & Trinken | 07.10.2005 | 1 | Aschersleben |
| 0710.1-BEB_HP01___7000_70_70.pdf | 1 | Bemburger Kurier | 07.10.2005 | 2 | Bernburg |
| 0710.DT-02_HP02___7000_70_70.pdf | 2 | Der Tag | 07.10.2005 | 2 | Bernburg |
| 0710.MI-03_HP03___7000_70_70.pdf | 3 | Mitteldeutschland | 07.10.2005 | 2 | Bernburg |
| 0710.MH-04_HP04___7000_70_70.pdf | 4 | Meinung und Hintergrund | 07.10.2005 | 2 | Bernburg |
| 0710.PO-05_HP05___7000_70_70.pdf | 5 | Politik | 07.10.2005 | 2 | Bernburg |
| 0710.WI-06_HP06___7000_70_70.pdf | 6 | Wirtschaft | 07.10.2005 | 2 | Bernburg |
| 0710.WI-07_HP07___7000_70_70.pdf | 7 | Wirtschaft | 07.10.2005 | 2 | Bernburg |
| 0710.KU-08_HP08___7000_70_70.pdf | 8 | Kultur | 07.10.2005 | 2 | Bernburg |
| 0710.BEB09_HP09___7000_70_70.pdf | 9 | Bemburger Kurier | 07.10.2005 | 2 | Bernburg |

Fig. 2

L007;Z0668;100126591;;Herr;Helmut;Dürr;06507;Stecklenberg;Dorfstr.;6;Guten Morgen;";Die MZ übergibt Ihnen Ihr persönliches Exemplar;;8;Test1;Test2;Test3;Test4;Test5;Test6;Test7;Test8;..."",,,,,,,,,,,,,,,,,,,,,,,,,,,,,, L008;Z0501;100126627;;Herr;Norbert;Lettow;06317;Seeburg;Nordufer;18;Guten Morgen;";Die MZ übergibt Ihnen Ihr persönliches Exemplar;;12;Test1;Test2;Test3;Test4;Test5;Test6;Test7;Test8;Test9;test10;Test11;Test12"",,,,,,,,,,,,,,,,,,,,,, L008;Z0501;100126594;Frau;Kathrin;Gothe;06507;Bad Suderode;Schwedenbergstr.;39;Guten Morgen;";Die MZ übergibt Ihnen Ihr persönliches Exemplar;;4;Test1;Test2;Test3;Test4;..."",,,,,,,,,,,,,,,,,,,,,,,,,,,,,,,, File "export.csv"

Fig. 3a

Test1
Test2
Test3
Test4
Test5
Test6
Test7
Test8
Test9
Test10
Test11
Test12

File "export1020.test"

Fig. 3b

-pgs 1, 9, 21 : 1 ! / $COMPOSER/root/Test1.ovl ! 1 ! 0mm, 0mm
-pgs 2, 10, 22 : 1 ! / $COMPOSER/root/Test2.ovl ! 1 ! 0mm, 0mm
-pgs 5, 13, 24 : 1 ! / $COMPOSER/root/Test3.ovl ! 1 ! 0mm, 0mm
-pgs 6, 14, 23 : 1 ! / $COMPOSER/root/Test4.ovl ! 1 ! 0mm, 0mm
-pgs 8, 17 : 1 ! / $COMPOSER/root/Test5.ovl ! 1 ! 0mm, 0mm
-pgs 7, 18 : 1 ! / $COMPOSER/root/Test6.ovl ! 1 ! 0mm, 0mm
-pgs 4, 20 : 1 ! / $COMPOSER/root/Test7.ovl ! 1 ! 0mm, 0mm
-pgs 3, 19 : 1 ! / $COMPOSER/root/Test8.ovl ! 1 ! 0mm, 0mm
-pgs 16 : 1 ! / $COMPOSER/root/Test9.ovl ! 1 ! 0mm, 0mm
-pgs 15 : 1 ! / $COMPOSER/root/Test10.ovl ! 1 ! 0mm, 0mm
-pgs 12 : 1 ! / $COMPOSER/root/Test11.ovl ! 1 ! 0mm, 0mm
-pgs 11 : 1 ! / $COMPOSER/root/Test12.ovl ! 1 ! 0mm, 0mm
-tray_offset 1tn : 1 ! x, 0

File "export1020.imp"

Fig. 3c

Demo Program (IFRA 2005) © océ & Mitteldeutsche Zeitung [hte] 0.8 [Beta]

File  Edit  Help

Master data | Apply/change additional subscriptions | Page association | Options

Business Partner

Customer number: 100126591

Name: Dürr

First name: Helmut

Address

Street / H. Nr.: Wurmtal | 47

Postal Code / City: 06507 | Stecklenberg

PO Box:

Subscription (Primary Edition)

Edition: QBG ▼ | Quedlinburg

Publisher: Mitteldeutsche Zeitung

Logistical Info

ID / Route / U-Route: 68 ▼ | T065 | U050

Depot Point/Vendor/tDeliverer: AB07 | L007 | Z0668

[▲ ▲ + − ◀ ▶ ↻]

— 27

Search

Search term:

Start search ─── 28

Fig. 5

Fig. 7

METHOD COMPUTER PROGRAM AND DEVICE FOR GENERATION OF INDIVIDUALIZED PRINT MEDIA COPIES

BACKGROUND

The preferred embodiment concerns a method, a computer program and a device for generation of individualized and in particular personalized media print copies such as, for example, personalized newspapers.

Newspapers and magazines have previously predominantly been generated as mass printed matters with editions of at least multiple tens of thousands of copies. The readers of the newspaper thereby respectively receive in the same manner all information of the newspaper that is provided by the editorial department. With the arrival of digital printing technology, in particular what is known as print-on-demand printing, the idea has become more and more established to generate customer-specific, individualized print copies of media titles in which only specific, individual information selected by or from the reader are delivered to the reader from a plurality of items of information prepared by the editorial department.

A method for generation of individualized newspapers is known from the publication "Jeder sein Chefredakteur", Technology Review—Das M.I.T.—Magazin für Innovation, Nils Schiffhauer, Heise Zeitschriften Verlag, Hannover, December 2004 and DE-A-101 61 684.

From WO-A1-03/054783 it is known for computer-aided generation of newspaper pages to send corresponding files per page from an editing computer directly to a receiving computer of a printing center immediately after the finalization of the pages at the editing computer, and there at the printing center to begin with the imposition of the pages immediately after arrival of all page files of a signature.

A method for what is known as imposition of print data to be printed per page is known from WO-A-00/68877, which method enables a plurality of pages to be printed together on one medium and the medium to be folded once or multiple times, wherein the print data are re-sorted per page in the imposition process before the printing process so that they come to lie in the correct sequence of the page numbers after the printing and folding.

Digital printing technologies (in particular electrography, including magnetography as well as inkjet technology) that are suitable for printing of individualized documents are described from the publication "Digitaldruck, Technik und Drucktechnologien der Océ Drucksysteme", Océ Printing Systems GmbH, 9th Edition, February 2005, ISBN 3-00-001019-X, in particular in the chapters 4.3 and 5.

A method, receiving server and a computer program module for automated acceptance and relaying of digital document processing jobs in a print production system are described in WO-A2-03/065197.

A method for resorting a print data stream according to predetermined criteria, such as document-individual postal codes of addressees that are contained in the documents of the print data stream, for example, is known from WO-A2-01/77807, whereby the printed documents can be time- and cost-effectively processed further in a logistics or delivery process.

A uniform specification that is designated as a job definition format (JDF) was developed as an industry standard for cross-system control of document processing processes, for example from the generation of the document up to the delivery of a printed and packaged document. There is a corresponding job notification format (job messaging format or, respectively, JMF) for this that is correspondingly specified. The specification of JDF can be downloaded from the Internet site www.cip4.org; the current specification at the point in time of the present patent application is JDF Specification Release 1.2.

The publications cited above are herewith incorporated by reference into the present specification.

SUMMARY

It is an object to enable an efficient workflow in the production of individualized print copies of media titles.

In a method or system for generation of customer-specific, individualized media print copies of at least one media title, running data are generated in an editing computer, the running data being associated with a media page, the running data comprising reference information regarding media pages of the media title. The running data are transferred to a job system. In the job system, job data of an individual job are generated from the running data and from customer-specific data that correspond to media categories of the media title. Individual page frame data are formed from the job data that correspond to a job-individual layout of the media print copy. Control information is attained from the job data and with the control information the page frame data are merged with page content data of pages filled with editorial information generated by an editorial department according to the running data to form print data for printing of the media print copy.

BRIEF DESCRIPTION OF THE DRAWINGS

FIG. 2 illustrates a running list;

FIG. 3 shows job and control data;

FIG. 5 illustrates an interface for configuration of customer data;

FIG. 7 illustrates an individualized newspaper.

DESCRIPTION OF THE PREFERRED EMBODIMENT

Figure 1:
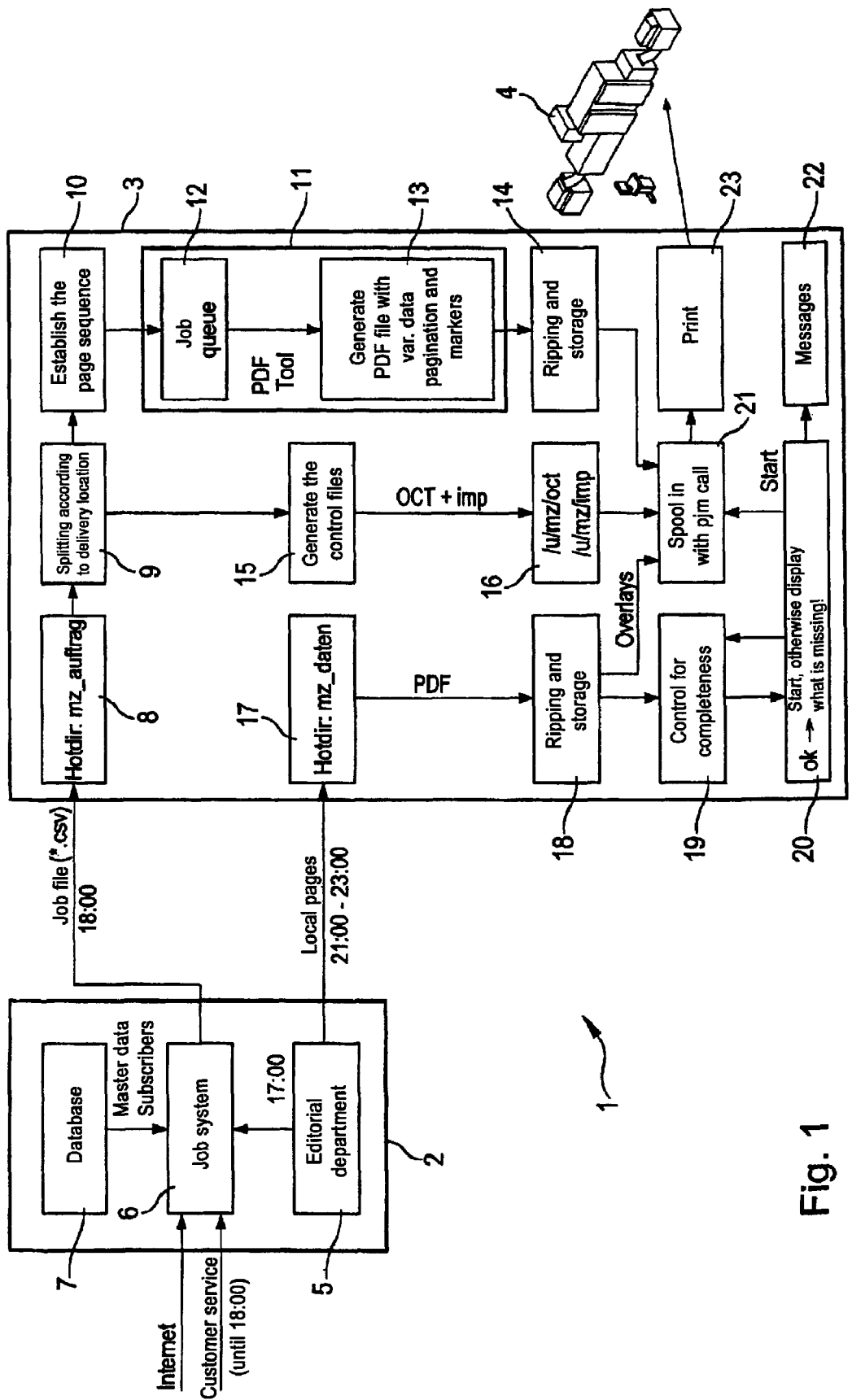
FIG. 1 illustrates a system of a preferred embodiment for generation of individual print copies of a media title.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

According to a first aspect of the preferred embodiment, for generation of customer-specific, individualized media print copies of at least one media title what are known as running data are generated in an editing computer. The running data are respectively associated with a media page, wherein the entirety of the running data comprises of reference information regarding all media pages of the media title that are to be generated by an editorial department for a specific output point in time. The running data are subsequently transferred to a job system in which what are known as job data of an individual job are generated from customer-specific data that correspond to media categories of the media title that are individually selected by the media customers and from the running data. What are known as individual page frame data that correspond to the job-individual layout of the media print copy and in particular comprise job-individual data are then formed from these job data. Furthermore, control information is attained from the job data, with which control information the page frame data are merged with what are known as page content data of the pages filled with editorial contents (which pages are generated by the editorial department according to the running data) to form print data for printing of the media print copy.

Via the provision of the running data and the individual generation of the page layout from the running data, the print production process can take place very efficiently overall since the entire data of all editorial page contents do not have to be processed to form the page layout data, but rather only their job-individual reference information contained in the running data. With this it is in particular achieved that page content data do not have to be processed again multiple times, specific to the customer in the generation of the layout and in particular in the rastering of the customer-specific information to execute a plurality of customer-individual print jobs. The preferred embodiment allows these editorial page data to respectively be superimposed with the customer-specific data only once in rasters and only at a relatively late processing stage, whereby a significant potential of saved storage requirements and reduced data transfer volumes is utilized.

According to a second aspect of the preferred embodiment, to generate individualized media print copies of a media title, data-containing, per-page editorial information of the media title are transferred to a document output management system separate from data of per-page reference information regarding the editorial information of the media title. Furthermore, customer-specific data about the individual composition of the media print copy are in particular merged per-category with the associated reference information into what are known as individualized job data. The page-spanning layout of the media print copy is furthermore individually established on the basis of the individualized job data. Corresponding individual page frame data are then in particular automatically generated from the layout so established and then the page frame data are merged with the data-containing, per-page editorial information of the media title to form print data for the media print copy.

The second aspect of the preferred embodiment can be executed alone or in combination with the first aspect of the preferred embodiment.

The production of the print copy can be simplified and accelerated via the transfer of the reference information separate from the page content data because techniques preparing for the production of the editorial pages can already be implemented from the reference data for a plurality of individual print jobs at a very early point in time in the production workflow of the media title or its print copy, in particular before the production of the editorial pages. These techniques can comprise the determination of the job-individual merging scheme, for example, as well as the generation of a print data stream including the insertion of customer-specific data (such as, for example, a customer name), the generation and insertion of markings for post-processing apparatuses in the print data stream and/or the rasters of the job-individual print data thereby generated.

According to a third aspect of the preferred embodiment that can be executed alone or in combination with one or both of the aforementioned aspects, data-containing, per-page editorial information of the media title can be transferred to a document output management system separate from data-containing, per-page reference information regarding the editorial information to generate individualized media print copies of a media title. Furthermore, customer-specific data about the individual composition of the media print copy are in particular merged per category with the associated reference information into what are known as individualized job data. By means of these page frame data are generated that correspond to the individual layout of the media print data copy. Furthermore, in the document output management system it is periodically monitored whether all data belonging to the media print copy are input with the per-page editorial information. As soon as all data referenced in the job data with the per-page editorial information are available in the document output management system, the page frame data are merged with the data-containing, per-page editorial information to form print data for the individualized media print copy.

In particulars method workflows that are particularly suitable for automation in the generation of individualized media print copies are specified with the preferred embodiment. In particular, media documents appearing under a common title, such as a specific daily newspaper or a specific magazine that are editorially connected in terms of organization and/or data are considered as media titles. Naturally, the editorial department of such a media title can possess different sub-editorial departments per category (for example for politics, business, health or also for local editions of a newspaper).

The running data can thereby in particular contain data associated with a category of the media title, the publication date, the title name and/or the page numbering. The job-individual data can likewise contain category data and furthermore address data, customer name data and/or salutation data.

The page-individual data in particular comprise pagination data and/or data for controlling a print post-processing and/or pre-processing apparatus. The data for a print post-processing apparatus can in particular comprise print marker data that are transfer-printed onto the printed copy and are scanned by the post-processing apparatus to control the post-processing apparatus.

According to an advantageous exemplary embodiment of the invention, the page frame data and/or the page content data are rastered before their merger. Rastered data of one type or of the other type can thereby in particular be superimposed as what is known as an overlay one below the other or be superimposed with page data of a known print data stream such as, for example, Advanced Function Presentation (AFP), PostScript (PS) or Portable Document Format (PDF).

In the course of the production process of the media print copy, the print data are transferred to a printing system that comprises a printing apparatus and in particular a print server upstream from said printing apparatus in the data path.

The running data in particular contain respective data regarding a media page, which data correspond to a file name and/or a page number, a page title, a media category, a publication date, a publication number and/or the media title associated with the page. The media print copy and the running list in particular contain data of a plurality of media categories and/or a plurality of media titles.

According to a further advantageous exemplary embodiment of the invention, the job data are subjected to an imposition process before the individual page frame data are formed.

One or more print copies with information from a plurality of media titles (in particular of the same publication time or of a common publication time period) can be printed with the preferred embodiment for a media customer, wherein the media titles can in part possess the same page content data. In particular using a comparison of the association running data and/or job data, the corresponding repeated running data and/or job data can thereby be deleted, and it is thus avoided that a page in a print copy is printed twice.

The customer-specific data can in particular be stored in a database; furthermore, these data (in particular concerning the selected media titles and/or media categories) are in particular transmitted via the Internet by customers by means of a network connection.

The preferred embodiment is therefore in particular suited to be realized as a computer program that effects a corresponding method workflow upon loading and execution on a computer. It can naturally also be designed as a corresponding device.

A system for generation of customer-individual print copies of media titles is shown in FIG. 1, wherein the media titles in this case are local, at least partially different editions of a newspaper, for example, which editions possess partially identical contents and local, partially different news.

A customer can thereby in particular order entire the local edition of his home newspaper, wherein this edition can in particular be conventionally produced in an impersonalized manner in offset printing. In addition to a daily delivered local edition, he can also compile his personal, individualized newspaper from other local editions and their guidebooks, sport and other sections. From only a few printed pages he thus has the possibility to be informed in a specific manner about further news not contained in his local edition. For the vendor of the information (i.e. the newspaper publisher), the possibility thereby exists to connect the customers more strongly to the publisher.

A digital print production system 1 of the preferred embodiment for individualized newspapers comprises a publisher-side computer system 2, a digital print production computer system 3 and a printing apparatus 4. The print production computer system 3 comprises components of a document output management system with which the relaying and processing of documents that in particular comprise one or more pages can be controlled in various process stations.

Individual information can be printed out point-by-point for each print page with the digital print production system 1. It can in particular comprise a printing apparatus known under the trade designation Océ Variostream® 9220 with which print data can be printed in black-and-white and/or color at a speed of some hundreds of pages per minute.

The publisher computer system 2 comprises an editing computer 5 on which the editorial pages are generated; a job system 6 in which the customer-individual print jobs are composed; and a relational database 7 in which all customer data or subscriber data (such as, for example, their name, address, standard regional edition and individualized, ordered media titles or categories) are stored.

On the one hand, data in the database 7 can be changed via the job system 6 and on the other hand master data of the subscribers can be adopted via the job system 6 to generate the customer-specific job file for an individualized print copy. Orders for such an individualized copy can be passed from the customer (for example via telephone) via a service center or via an Internet data connection to the job system 6 daily up to a certain time (for example 6 PM). A job file for the print copy that can already be delivered to the customer on the next morning via conventional distribution services of the newspaper publisher is generated with these data. The customer-individual newspaper copies so printed with the information in particular of other local editions can then be combined with the local edition of the customer conventionally printed in offset and be delivered together to the customers via the conventional way or also the mail or other delivery services.

Every day, the editorial department of the newspaper or the respective editorial departments of the local newspapers generate on the editing computer 5 a running list which contains the names of all pages of the newspaper or the local newspapers incorporated for the next point in time (day) of the edition. The running list can change in the course of a day due to current events, however it is ultimately fixed at a certain point in time (in particular in early evening at 5 PM). In particular only page names are specified as page codes that can be referenced in the running list, wherein the title of the local portion, the date as well as the page number are contained encoded in every page name. For example, some hundred up to over a thousand pages can be generated per day by the editorial department or the individual local editorial departments of a newspaper. Each page is in particular stored in a single file. However, a plurality of pages can also be merged into a page group and can be encoded, referenced and processed together per group.

The composition of a regional edition of the newspaper changes daily with regard to the layout, in particular with regard to the page count, columns or categories (such as, for example, sports, guidebooks etc.). The customer-specific information of the database 7 is therefore compared daily in the job system with the running list data delivered by the editing computer 5, and a print job is generated using the current page names. For every customer-individual newspaper the job system 6 thereby checks the page number and its divisibility by the divisor 4, corresponding to the imposition method required in the printing system, and supplements these newspaper data as needed with advertisements and filler pages that are newly defined daily (for example crossword puzzles or advertisements) to ensure the divisibility. These daily varying control data are transmitted to the document output management system 3 at a specific time (for example at 6 PM), in particular as a file with comma-separated values (CSV). It in particular contains a line for every subscriber with the personal data, his delivery circuit and the page order of his personal newspaper copy.

The job file is transferred to a directory "mz_job" 8 of the production system 3 which monitors the job directory 8 regularly (for example every minute) with what is known as a HotDir function and immediately reads out newly input data and processes them further. The data are thereby processed by a computer program module 9 that sorts the data of the job file according to the delivery location. Individual print copies that later leave the printing apparatus 4 can thereby be directly merged one after another with non-individual, offset-printed newspapers and be directly relayed per location or per region for delivery without further sorting procedures. The computer program module 9 or the process effected with this can in particular be designed according to the teaching of WO-A2-01/77807, wherein of the sub-processes described there ("Conversion into a standardized data format", "Indexing", "Sorting") the sorting process can be executed alone or together with one or both of the other sub-processes. At this point this publication is hereby again incorporated by reference into the present specification.

For example, the aforementioned HotDir function can be executed by the method, receiving server and computer program modules for automatic acceptance and relaying of document processing jobs that are described in WO-A2-03/065197, wherein the receiving or print server cited in WO-A2-03/065197 is in particular arranged in a production system 3 of the present preferred embodiment and contains the directory "mz_job" 8. At this point WO-A2-03/065197 is again incorporated by reference into the present specification.

Furthermore, in a process 15 control files OCT, imp are generated (see FIG. 3c) with the computer program module 9 for job distribution and are stored in a directory 16 with which the editorial pages 17 can later be superimposed with the individualized data 13. The file OCT contains a name (in particular corresponding to the name of the job file) for a print job as well as a production system-internal identifier such as, for example, the arrival time of the job file in the job directory 8. Furthermore, the file OCT can possess a corresponding identifier for the district given a division of the print jobs into various district-related jobs with the computer program module 9. The file imp contains data that determine the association of editorial page data with the imposition scheme established in step 10, which is described in more detail in the following.

After the job distribution with the computer program module 9 the customer-individual data are subjected to a process 10 to establish the page order, wherein an individual imposition scheme forms the basis for a customer-individual print job. Customer-individual clusters or signatures are thereby generated and corresponding individual print markings are generated for post-processing apparatuses (such as cutting devices and folding devices) downstream of the printing process. Calculations regarding the position of pages and their markings are correspondingly individually implemented for each print copy.

The data so calculated are supplied in a job file 12 to what is known as a "PDF tool" 11 which generates a customer-individual PDF file with customer-specific Variable data, a page numbering (pagination) and possibly markers for post-processing devices in PDF format from the customer-individual job data in a process 13. For the preferred embodiment it is clear that corresponding tools for other print data languages (such as Postscript, AFP and so forth) can be used instead of such a "PDF tool".

The PDF file essentially contains blank pages in which the concrete, editorial filled pages and the aforementioned customer-specific data etc. can be superimposed later.

The customer-specific PDF file is rastered in a process 14 (raster image process, RIP) and the rastered file is in particular stored in a TIFF (Tagged Image File Format) format or IOCA (Image Object Content Architecture) format in a buffer until all data required for the respective customer job are available with editorially filled contents in the print production system 3.

The aforementioned processes for individualized newspaper documents can be concluded within a few hours for a newspaper edition planned for the next day for a plurality of subscribers. In the meantime the editorially filled pages can be generated in an editing computer 5 and be successively sent (for example in the PDF data format) per page to the print production system 3 into a directory "mz_data" 17 there, for example between 9 PM and 11 PM. In the print production system 3 this directory is likewise regularly monitored for the arrival of new files (likewise according to the aforementioned HotDir method which, for example, can be executed according to WO-A2-03/065197—see the explanations further above regarding the directory "mz_job" 8—and can in particular be stored in the same receiving or print server as the directory "mz_job" 8), and new files are immediately subjected to a raster process 18 and the data so rastered are stored in a memory, in particular as TIFF or IOCA files. These rastered data can be monitored for completeness in a process 19, and which data are missing can possibly be displayed in a process 20. Given completeness the process 21 can be enabled in which the customer-specific, rastered file generated in the process 14 are superimposed (overlay function) with the corresponding non-individualized, rastered data of the editorial pages that are stored in the process 18. This pixel-by-pixel overlaying is controlled specific to the job and page by the files "oct" and "imp" stored in the process 16. In the case of errors established in the process 20, messages 22 can be output and a further control can be initiated.

A per-job comparison between editorial pages required for the job and the rastered pages already stored in the process 18 occurs in a process 21, in particular continuously. If all pages are present, the superimposition and subsequent generation of a print job (inclusive of a spooling process) is begun. The laid pages are thereby placed as an overlay on the correspond correct pages of the file generated with the PDF tool 11.

The superimposition and spooling process 21 can furthermore be controlled with job-specific companion data (what are known as job ticket data). According to a page description language (page description language, PDL) such as, for example, AFP or Postscript can thereby be generated in turn as a print file. Print data are correspondingly output from the print production system 3 via an interface 23. The output can occur directly at a printing apparatus 4 or with interconnection of a print server.

A table in which the per-page references contained for two newspaper editions in the running list are indicated as coded file names in a first column with the heading "File name" is shown in FIG. 2. The respective local edition in which the respective page is printed is indicated in the column with the heading "Real name". The respective number of the page that corresponds with the final print copy is indicated in the column with the heading "Page number". A title describing the corresponding page is indicated in plain text in the column with the heading "Title". The respective publication date of the page or of the newspaper title is contained in the column with the heading "Date". The column with the heading "Edition" contains a publisher-internal number for the respective local edition of the newspaper.

The file names of the running list are coded according to the following scheme: ddmm.Ti(n)_HPm_7000_70_70.PDF, wherein dd designates the day of the date mm designates the month TI an abbreviation for the respective media title or the media category, for example ALN for Aschersleber Zeitung, DT for "der Tag", WI for Wirtschaft etc.

(n) optionally a page specification with regard to the title and m the page specification for the respective edition HP an abbreviation for a local edition or its main page number and m a page count of the corresponding local edition An example for a job file "export.csv" is indicated in FIG. 3a. In this case the job comprises three print copies for three people: "Dürr", "Letow" and "Gothe". The corresponding delivery zone (L007 or L008), a delivery area (Z0886 or Z051), a customer number, address, first name, last name, postal code, city and street are indicated for each person. A formulaic greeting ("Good Morning") follows after this as well as a further notice ("MZ delivers you your personal copy") respectively printed in a header line on the individualized print copy. An indication of the total count of the pages in the print copy follows this, and the respective pages to be printed (Test 1, Test 2 and so forth) are subsequently indicated.

A list (reproducing FIG. 3b) is generated as a file "export1020.test" upon importation of the job file into the directory "mz_job" 8. The file "export1020.test" contains all pages necessary for the respective job. It is used in a spooling process 21 in order to compare pages required for the job with the laid pages with the editorial information that are already finished in the process 18.

Since multiple hours can pass between the job order via generation of the job file and the preparation of the local pages by the editorial department, the file "export1020.test" is advantageously to be checked in a spooling process 21 when all files necessary for the respective job exist in a finished, laid form.

The file "OCT" contains only a few data, wherein the name of the job file (csv) as well as the current time of the job order (i.e. when the file was stored in the directory "mz_job"). Furthermore, information can be contained about the respective district (i.e. the respective delivery location) according to which a job has been divided up in the process 9.

An example for an imp file "export1020.imp" is reproduced in FIG. 3c. For each editorial overlay page it contains the respective job pages in which this overlay page should be placed. For example, the overlay file for page "Test 1" should be reproduced on the job pages 1, 9 and 21.

Figure 4:
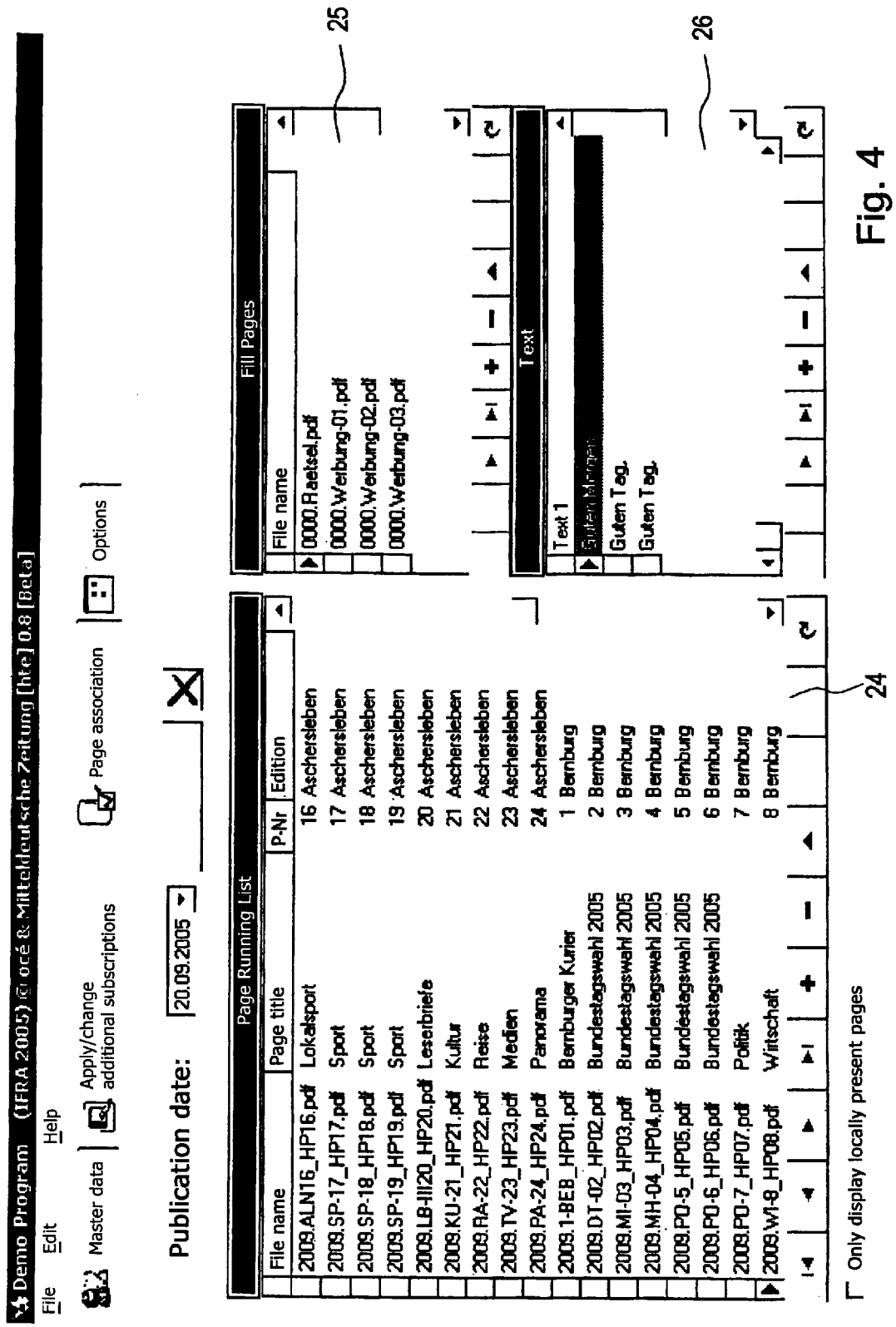
FIG. 4 shows an interface for configuration of a job file.

The graphical display of a user interface of the job system 6 is shown in FIG. 4. The page association for a specific publication date of various local editions of a newspaper can be adjusted via this interface. All file names of the running list are given in the sub-window 24 and can be individually named in the column Page Title. The file names can thereby be displayed in two colors (for example red and green), wherein one of the colors (red) symbolizes that the corresponding page has not yet been finished in terms of content in the editing system 5 or been stored in the file "mz_data" 17, and the second color (for example green) symbolizes that the page is available. Furthermore, the corresponding page number for the various local editions can be established for each page name. Additional pages that are automatically imported as fill pages in the course of the imposition process can be determined a sub-window 25. In particular advertising pages can thereby be imported as fill pages. User profiles in which specific focal points of interest of the reader are taken into account can additionally be used in the determination of advertising fill pages for individualized editions of the newspaper, such that the advertising can be specifically tuned to user interests (individualized advertising, what is known as 1:1 marketing). Job-individual salutation texts can be selected via the sub-window 26.

The graphical user interface of the job system 6 for input and administration of master customer data of the database 7 is depicted in FIG. 5. It contains typical customer information such as the customer number, customer name etc. as well as an indication of the main title of the newspaper (here: publisher, Mitteldeutsche Zeitung) as well as about the local edition (here Quedlinburg) of the subscriber. The main title thereby corresponds to the non-individualized edition, in particular the edition printed in an offset printing method. Delivery information internal to the published (ID, route, U-route, depot point, vendor, deliverer) are contained in the sub-region "Logistical Info". Search functions can be executed in the master data in a sub-window 28.

Figure 6:
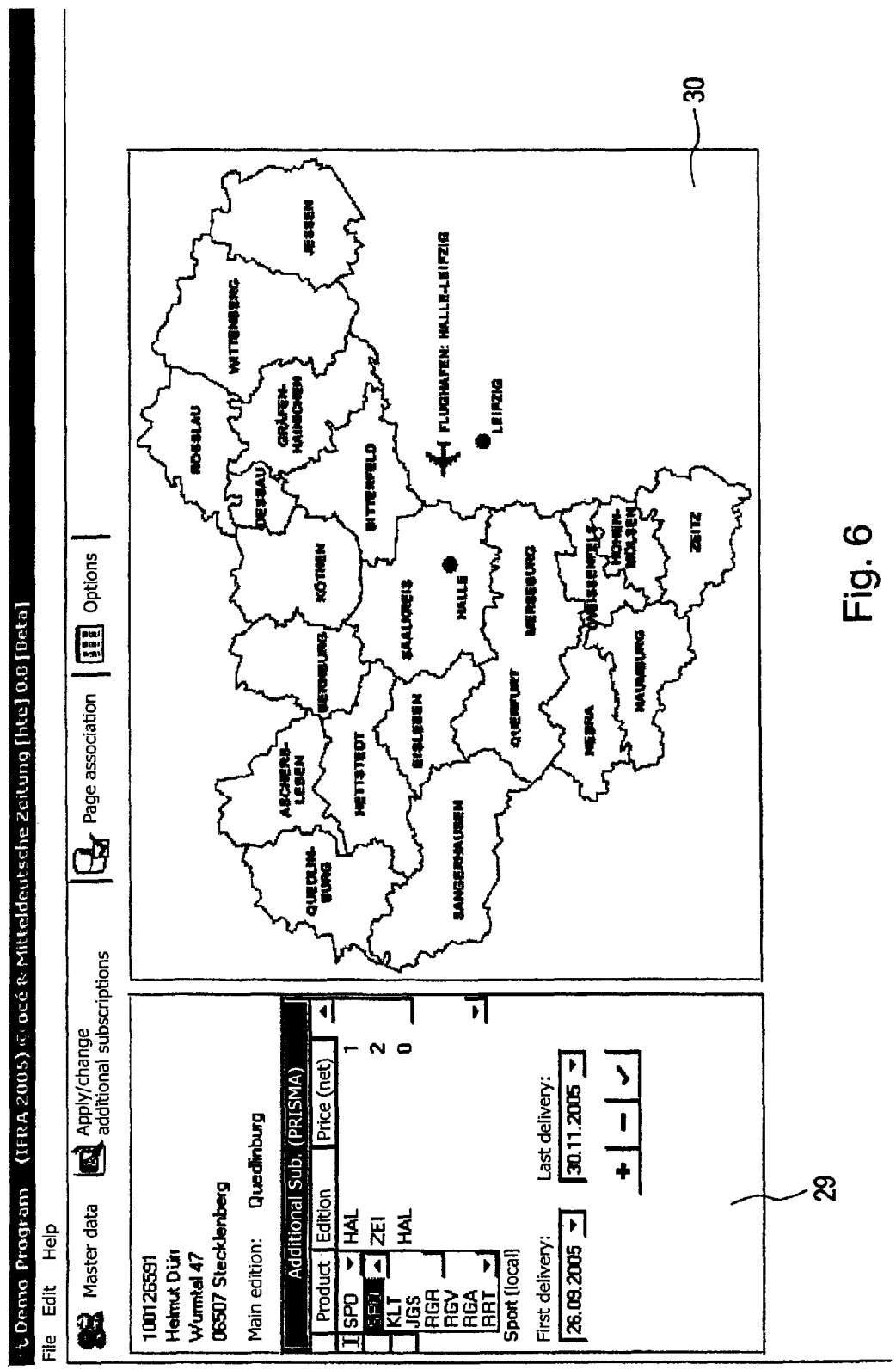
FIG. 6 shows an interface for customer-specific configuration of media titles or media categories.

The graphical user interface of the job system 6 via which the customer-individual, compiled print copy (additional subscription) can be configured is depicted in FIG. 6. Corresponding product categories (such as, for example, "SPO" (sports, local), "KLT" (culture), "ANZ" (Advertisements)) for other local editions (for example "HAL" (Halle)) can be composed and a certain delivery time period for first delivery and last delivery can be specified in the corresponding sub-window 29. The sub-window 30 shows a map of all local editions belonging to the publisher region, i.e. the media titles available in this. For a customer it is thereby also possible to order a plurality of local parts of various districts (regions) that are then respectively printed as customer-individual print copies. Editorial pages occurring identically in a plurality of such local parts can thereby be automatically detected (in particular optionally and possibly in a parameter-controlled manner) early in the workflow and in particular be removed from the individual job data or be filled with a suitable number of other pages (for example advertising, puzzles) under consideration of the divisor requirements of the imposition process before the corresponding imposition of a subsequent copy.

An excerpt from an individualized newspaper 31 is shown in FIG. 7. Customer-specific information such as name, salutatory text etc. are thereby in the header line 32.

Exemplary embodiments of the invention have been described. It is thereby clear that developments with regard to the invention can be specified by the average man skilled in the art at any time.

The print data, the participating control programs and/or the printing apparatus can alternatively be designed for pure black-and-white printing, for what is known as Custom-Tone® printing with one or more decorative colors and (in particular black) or even for a full color printing, for example.

Although newspaper titles have predominantly been cited for media titles in the aforementioned exemplary embodiments, it is clear that the invention is also suitable for other media titles such as, for example, advertising documents. The media titles thereby do not have to be planned by default as print copies; rather, they can also be stored as electronic documents, wherein the preferred embodiment enables an individualized print copy of the electronic media title (in particular online media title) to be generated.

Furthermore, although a plurality of data streams such as the running data or the job data have been described above with a specific data structure in the preferred embodiment, the invention is not limited to such data structures and can exhibit additional or fewer data structures. The running data can conform to an arbitrary, however in particular predetermined or standardized structure as long as they contain reference information regarding the data of the editorial content.

Instead of the described superimposition of rastered individualized pages with rastered editorial pages, the corresponding data can also exist in a page description language (PDL) such as, for example, AFP, Postscript, PCL (Printer Control Language) or PDF and be overlaid on one another or combined with one another. The data volumes thereby generated can be larger at the time than given the superimposition of rastered data.

The preferred embodiment and in particular the method workflows described above are suitable to be realized or automatically controlled with one or more cooperating computer programs (software). As a computer program module they can therewith be distributed or applied as a file on a data medium such as a diskette, DVD- or CD-ROM or via a data or communication network. Such comparable computer program products or compression elements are embodiments of the invention. The inventive workflow can be applied in a computer, in a printing apparatus or in a printing system with upstream or downstream data processing devices. It is thereby clear that corresponding computers on which the invention is applied can comprise further known technical devices such as input means (keyboard, mouse, touchscreen), a microprocessor, a data or control bus, a display device (monitor, display) as well as a working memory, a fixed disk storage and a network card.

The invention can also be integrated into a workflow or the workflow can comprise sub-components that correspond to the aforementioned job definition format (JDF). It can thereby be provided that JDF commands are processed, modified, executed or generated.

The preferred embodiment can be summarized as follows:

The preferred embodiment concerns a method, a computer program and a device for generation of individualized and in particular personalized media print copies such as, for example, personalized newspapers. Editorial page data are thereby transferred separate from reference data (what are known as running data) from an editing system to a print production system and job-individual imposition data are generated on the basis of the reference data. The generation of personalized print copies of media titles can be automated with the preferred embodiment and savings with regard to time and costs can be enabled.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for generation of customer-specific print jobs for customers to create individualized media print copies of at least one media title for the customers, comprising the steps of:
   providing a publisher computer system connected to a print production computer system for outputting said print jobs to a printing apparatus, said publisher computer system comprising an editing computer, a data base containing customer-specific data for the customers, and a job system;
   with said editing computer generating running list data comprising names of all media pages of the media title for a specific output point in time;
   with the job system generating job data files for the customers from the customer-specific data and the running list data;
   with said editing computer also creating editorial content data files for at feast some of said media pages;
   at said specific output point in time transferring the job data files to the print production computer system;
   also transferring with said editing computer said editorial content data files for corresponding media pages to the print production computer system at feast at one point in time which is after said specific output point in time when the job data files are transferred;
   in said print production computer system also generating individual page frame data files that correspond to customer-specific layouts for the job data files for the customers;
   also in said print production computer system generating control files for the job data files for the customers; and
   using said control fifes, merging the editorial content data files with the individual page frame data files to create print data for said customer-specific print jobs to be printed by said printing apparatus.

2. The method of claim 1 wherein the individual page frame data files are rasterized, the editorial content data fifes are rasterized, and the rasterized files are combined using said control files.

3. The method of claim 1 wherein said media title comprises a newspaper or magazine for the customers.

4. The method of claim 1 wherein at least some of said editorial content data files are transferred to the print production computer system at a plurality of points in time after said specific output point in time when the job data files are transferred.

5. The method of claim 1 wherein when each editorial content data file is received by the print production computer system it is immediately rasterized.

6. The method of claim 1 wherein said customer-specific data comprise an identification of at least one media title for a respective customer, an identification of topics of interest for the respective customer in order to identify corresponding names of said media pages, and pagination data.

7. The method of claim 1 wherein said media print copies printed on said printing apparatus are merged with a second non-individualized print copy of a second media title.

8. The method of claim 7 wherein the second print copy is printed in an offset printing method.

9. A non-transitory computer readable medium storing a computer program for use in generation of customer-specific print jobs for customers to create individualized media print copies of at least one media title for the customers and wherein a publisher computer system is provided connected to a print production computer system for outputting said print jobs to a printing apparatus, said publisher computer system comprising an editing computer, a database containing customer-specific data for the customers, and a job system, said computer program performing the steps of:
   with said editing computer generating running list data comprising names of all media pages of the media title for a specific output point in time;
   with the job system generating job data files for the customers from the customer-specific data and the running list data;
   with said editing computer also creating editorial content data files for at least some of said media pages;
   at said specific output point in time transferring the job data files to the print production computer system;
   also transferring with said editing computer said editorial content data files for corresponding media pages to the print production computer system at least at one point in time which is after said specific output point in time when the job data files are transferred;
   in said print production computer system also generating individual page frame data files that correspond to customer-specific layouts for the job data files for the customers;
   also in said print production computer system generating respective control fifes for the job data files for the customers; and
   using said control files, merging the editorial content data files with the individual page frame data files to create print data for said customer-specific print jobs to be printed by said printing apparatus.

10. A system for generation of customer-specific print jobs for customers to create individualized media print copies of at least one media title for the customers, comprising:
   a publisher computer system connected to a print production computer system for outputting said print jobs to a printing apparatus, said publisher computer system comprising an editing computer, a database containing customer-specific data for the customers and a job system;
   said editing computer generating running list data comprising names of all media pages of the media title for a specific output point in time;

said job system generating job data files for the customers from the customer-specific data and the running list data;

said editing computer also creating editorial content data files for at least some of said media pages;

said job system at said specific output point in time transferring the job data files to the print production computer system;

said editing computer also transferring said editorial content data files for corresponding media pages to the print production computer system at least at one point in time which is after said specific output point in time when the job data files are transferred;

said print production computer system generating individual page frame data files that correspond to customer-specific layouts for the job data files for the customers;

said print production computer system also generating control files for the job data files for the customers; and said print production computer system, using said control files, merging the editorial content data files with the individual page frame data fifes to create print data for said customer-specific print jobs to be printed by said printing apparatus.

* * * * *